June 28, 1932. W. O. HERRMANN ET AL 1,864,541
PROCESS OF OXIDIZING ORGANIC SUBSTANCES
Filed May 1, 1925
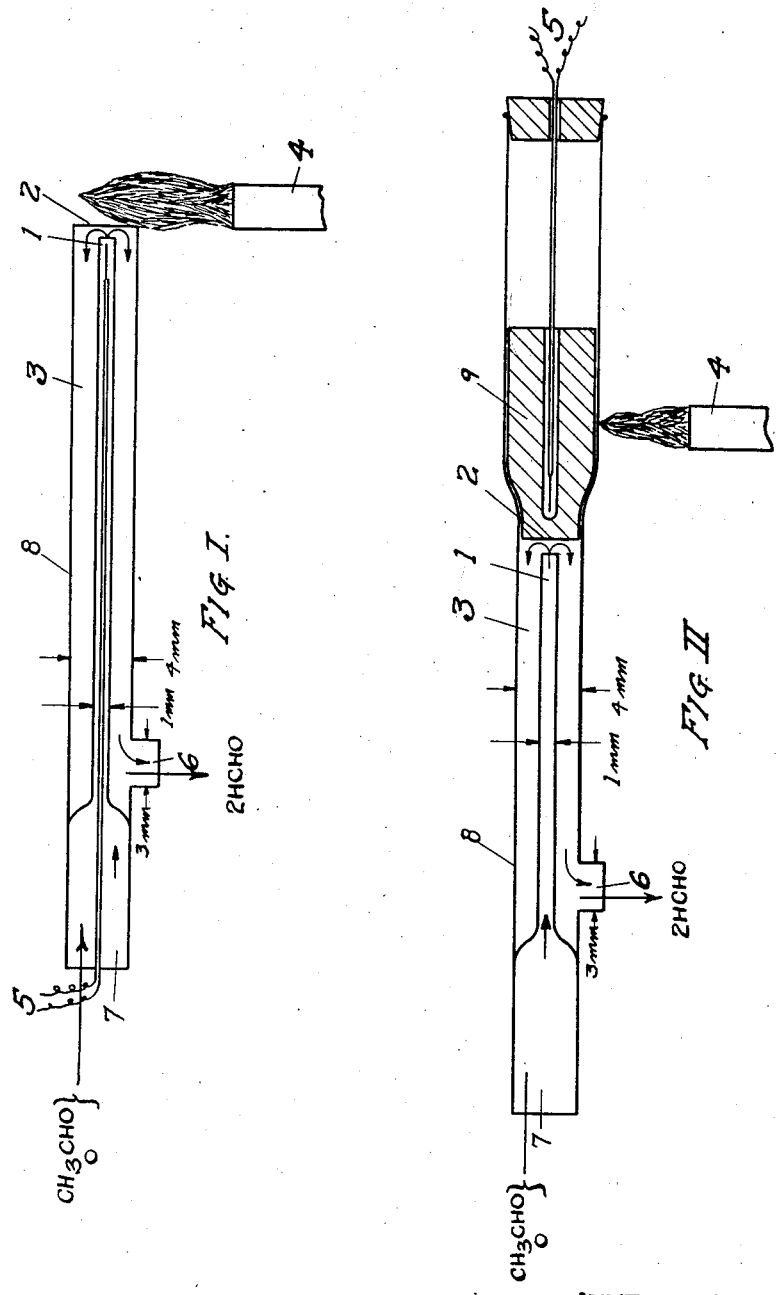
INVENTORS
Willy O. Herrmann
Erich Baum
BY
ATTORNEY Patented June 28, 1932

1,864,541

UNITED STATES PATENT OFFICE

WILLY O. HERRMANN AND ERICH BAUM, OF MUNICH, GERMANY, ASSIGNORS TO CONSORTIUM FUR ELEKTROCHEMISCHE INDUSTRIE, OF MUNICH, GERMANY

PROCESS OF OXIDIZING ORGANIC SUBSTANCES

Application filed May 1, 1925, Serial No. 27,296, and in Germany May 6, 1924.

We have found that organic substances are advantageously partially oxidized by mixing them with oxygen containing gases or oxygen compounds and passing the mixture at high velocity in contact with heated surfaces.

The process may be, for instance, carried out by passing the mixture of the gases at high velocity through narrow capillary tubes heated only for a small portion of their length. A very advantageous way of carrying out the process is blowing the mixture of the gases through a narrow opening against a heated reflecting face. The rate of passage of the gases through the opening being adjusted to suit the particular mixture of organic substances, oxidizing means, and temperature of the reflecting face used.

The products of reaction may be withdrawn from the reaction chamber by a narrow tube concentrically surrounding the inlet tube. The present process may be combined with known measures for chilling the reaction gases.

By this new method a very smooth reaction process for many oxidations is attained.

When carrying out the reaction by means of a reflecting face this face may be constructed from a material with catalytic activity as copper, silver etc. By addition of gaseous catalyzers, as vapors of nitric acid, nitric oxides, etc. the reaction may be favorably influenced.

In the accompanying drawing, Fig. 1 illustrates one form of apparatus suitable for carrying out the process, and Fig. 2 illustrates a modification.

In Fig. 1 the mixed reaction gases are forced in at the point 7 and through the narrow tube 1. The mixed gases exit from the tube at 1 and impinge at high velocity on the heated glass tube end 2. The reaction gas return 3 is formed by the larger jacket tube 8. The reacted gases leave the apparatus at 6 and are then cooled or otherwise manipulated to obtain the reaction products.

Fig. 2 illustrates the use of a special catalytic contact surface 2. The plug 9 is formed of catalytic material and is fitted gas tight into the jacket tube 8 a short distance from the exit end of the small bore tube 1. The operation of this is the same as in Figure 1.

The heating may be accomplished by any suitable means such as direct flame or electric heating elements. 4 shows the heating accomplished by a Bunsen burner. Temperature observation is made by means of the thermocouple 5 in close proximity to the heated face.

The process may be generally used for partial oxidation of acetaldehyde, ethylene or methanol, for the manufacture of maleic acid from benzene and the like.

Example I

Through a nozzle 1 mm. in diameter 5 liters of oxygen and 9.6 g. acetaldehyde are blown in one hour against a reflecting face of glass, heated to 400° C. The gas is drawn off through a capillary tube concentrically surrounding the nozzle and led through a washer, where the generated formaldehyde is condensed. The acetaldehyde is oxidized by this means to formaldehyde with nearly theoretical yield. The reflecting face may be constructed from copper or silver instead of glass.

Example II

The proceeding is the same as in Example I, but instead of oxygen 10 liters of nitrous oxide ($NO_2$) are used, the reaction proceeding similarly to Example I. Instead of $NO_2$ other oxides of nitrogen may be advantageously employed, for example $N_2O_3$ or $N_2O_5$.

Example III

The process is carried out in a capillary tube of 1 mm. diameter, heated for a distance 5 mm. to 200° C. During a period of one hour 90 liters of air mixed with a small quantity of nitric oxide ($N_2O_3$) and 50 g. acetaldehyde are passing through. The yield of formaldehyde is nearly theoretical.

Example IV

Through a capillary tube of 1 mm. diameter 2.5 g. methanol and 100 liters of air are blown in a period of one hour against a reflecting face of copper heated to 550° C. About one third of the methanol is oxidized into formaldehyde with theoretical yield, the remainder being quantitatively recovered.

By the expression "partially oxidizing organic substances" as used in the claims is meant oxidizing substantially all the organic substances to a product that is partially oxidized in contrast to oxidizing completely a fraction of the organic substance.

What we claim is:

1. Process of partially oxidizing organic compounds containing carbon, hydrogen and oxygen which consists in causing mixtures of the said compounds with oxygen to be projected through capillary tubes heated only for a small portion of their length.

2. Process of partially oxidizing acetaldehyde to formaldehyde which consists in causing a mixture of acetaldehyde with an oxygen bearing gas to be projected through capillary tubes heated only for a small portion of their length.

WILLY O. HERRMANN.
ERICH BAUM.